(No Model.)
J. GLOVER.
BEEF CUTTER.
No. 294,031. Patented Feb. 26, 1884.
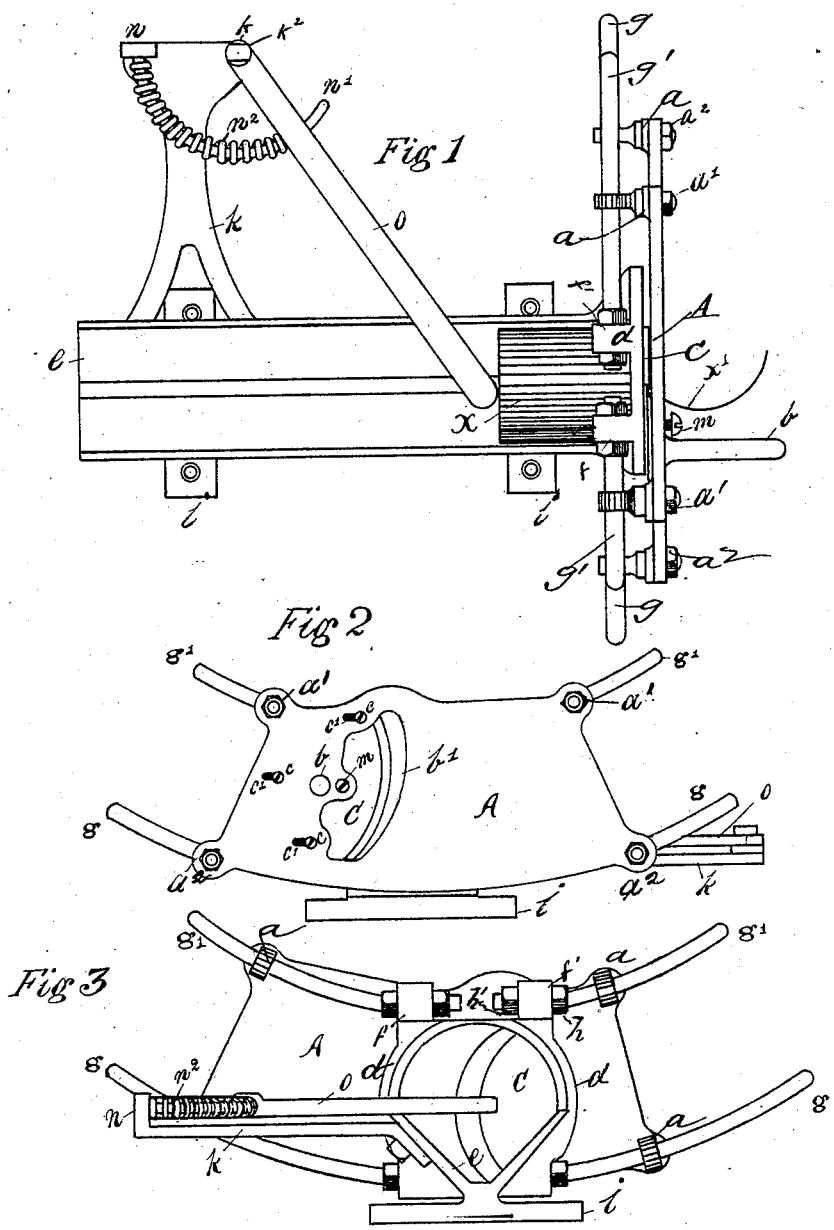
Witnesses
Richard A. Healy
Fred Warner
Inventor
Joseph Glover
by John Inglis atty

UNITED STATES PATENT OFFICE.

JOSEPH GLOVER, OF PATERSON, NEW JERSEY.

BEEF-CUTTER.

SPECIFICATION forming part of Letters Patent No. 294,031, dated February 26, 1884.

Application filed August 28, 1883. (No model.)

*To all whom it may concern:*

Be it known that I, JOSEPH GLOVER, a citizen of the United States, residing at Paterson, Passaic county, State of New Jersey, have invented a new and useful Improvement in Beef-Cutters, of which the following is a specification, reference being had to the accompanying drawings, forming a part thereof.

The object of my invention is to produce a beef-cutting device of such new and simple construction as to secure cheapness and durability thereto, which will be hereinafter fully explained.

Figure 1 of the drawings is a plan of the cutting device. Fig. 2 is a front elevation of the cutter head or stock; and Fig. 3 is an end view of the stationary head, arrangement of guides, &c.

A represents a cutter head or stock, which head or stock is provided with a curved opening, $b'$, and a handle, $b$. The stock or head is also provided at each of its corners with a stud, $a$, having an eye formed on the inner end of the same to adapt the studs to fit on and slide over guide-rods $g\ g'$, which rods are suitably curved therefor. The studs $a$ are secured in holes prepared therefor in the head or stock A by jam-nuts $a'\ a^2$. The inner side of the cutter head or stock A is provided with a curved cutting-tool, C, which the stock or head carries, and which tool is secured to said head by screws $c\ c\ c$, arranged in slots $c'\ c'\ c'$, as shown in Fig. 2. The head or stock is also provided with a screw, $m$, for adjusting the cutting-tool.

Behind the movable cutter head or stock A there is a stationary head, $d$, having suitable eyes, $f\ f'$, formed on the top and bottom of the same, in which to secure guides $g\ g'$, which guides are adjustably secured therein by jam-nuts $h\ h'$. The stationary head $d$ is a part of the V-shaped bed $e$, and is formed on the inner end of the same. The meat-bed $e$ is provided with suitable bed-pieces, $i\ i$, for securing the same. Near the outer end of the bed $e$ there is secured by set-screws $e'\ e^2$ a projecting arm, $k$, to which there is pivoted, by a pivot, $k^2$, a laterally-projecting arm, $o$.

In practice the meat $x$ is placed in the V-shaped bed-plate $e$ against the cutter head or stock A, the cutter-head having been drawn back on the guides $o'$, and the feed-rod $o$ drawn back and placed against the outer end of the meat $x$, which action puts the spring $n^2$ in tension, said spring being arranged on a curved rod, $n'$, secured at one end in a lug, $n$. The other end, passing through feed-rod $o$, keeps the spring in position to act promptly, which spring in its action presses the meat $x$ in the direction of the cutter-head A and against the same.

The cutter head or stock is operated back and forth by the handle $b$, which action puts the cutting-tool C into intermittent engagement with the meat $x$, cutting therefrom the cutting $x'$. The curved or rounded form of the cutting-edge of the tool C gives a small bearing-surface of the same on the meat $x$, owing to which but little power is required to operate the cutter-head. The cutting-tool C can be set to cut the cutting $x'$ to any desired thickness by means of the adjusting-screw $m$, which bears on the cutting-tool C and presses the cutting-edge farther from the cutter-head when the cuttings $x'$ are to be increased in thickness. The opening in the head or stock allows the cuttings $x'$ to pass out when the same are cut from the meat $x$.

By the simplicity of its construction, cheapness and durability are secured to the cutting device.

Having described my invention and its operation, what I claim, and desire to secure by Letters Patent, is—

1. The combination, with the stationary head provided with curved guide-rods, of the cutter-head having an eye-stud in each corner, and provided with a curved opening and an operating-handle, the cutting-tool C carried by said cutter-head, the devices for securing and adjusting said cutting-tool, and the means for securing the curved guide-rods, substantially as described.

2. The combination, with the stationary head provided with curved guide-rods, V-shaped bed, and projecting arm having a lug, of the feed-rod pivoted on said arm, curved rod secured in said lug and passing through the feed-rod, spring arranged on said curved rod for actuating the feed-rod, and securing means for the stationary head, substantially as described.

JOSEPH GLOVER.

Witnesses:
JOHN INGLIS,
KITTIE INGLIS.